United States Patent [19]

Gerlach

[11] Patent Number: 4,837,308

[45] Date of Patent: Jun. 6, 1989

[54] PROCESS FOR THE PREPARATION OF AZO COMPOUNDS

[75] Inventor: Rainer Gerlach, Leverkusen, Fed. Rep. of Germany

[73] Assignee: Bayer Aktiengesellschaft, Leverkusen, Fed. Rep. of Germany

[21] Appl. No.: 143,428

[22] Filed: Jan. 12, 1988

Related U.S. Application Data

[63] Continuation of Ser. No. 862,067, May 12, 1986, abandoned.

[30] Foreign Application Priority Data

May 14, 1985 [DE] Fed. Rep. of Germany ....... 3517273

[51] Int. Cl.$^4$ ............................................. C09B 27/00
[52] U.S. Cl. .................................... 534/578; 534/587; 534/615; 534/753; 534/768; 534/770; 534/787; 534/788; 534/791; 534/794; 534/795; 534/850; 534/852; 534/887
[58] Field of Search ................................ 534/578, 587

[56] References Cited

U.S. PATENT DOCUMENTS 3,153,031  10/1964  Alicot et al. ........................ 534/578

FOREIGN PATENT DOCUMENTS

| 1000119 | 1/1957 | Fed. Rep. of Germany ...... 534/578 |
| 100965 | 10/1973 | German Democratic Rep. ..................................... 534/578 |
| 457718 | 12/1936 | United Kingdom ................. 534/578 |
| 810736 | 3/1959 | United Kingdom ................. 534/578 |
| 1104391 | 12/1968 | United Kingdom ................. 534/578 |

OTHER PUBLICATIONS

Hunig et al, Ann. Der. Chem., vol. 754, pp. 46 to 55 (1971).

*Primary Examiner*—Floyd D. Higel
*Attorney, Agent, or Firm*—Sprung Horn Kramer & Woods

[57] ABSTRACT

A universally usable process for preparing azo dyestuffs by oxidative coupling consists in carrying out the oxidation in the presence of redox mediators with a standard potential of 0.2–1.5 volts and, if appropriate, an additional oxidizing agent with a standard potential of 0.25–2.5 volts, wherein the sum of the oxidation equivalents should be at least 4. The preferred redox mediator is iodine. The process is particularly suitable for the preparation of heteroaromatic azo dyestuffs using an aniline coupling component.

7 Claims, No Drawings

PROCESS FOR THE PREPARATION OF AZO COMPOUNDS

This is a continuation of abandoned application Ser. No. 862,067, filed May 12, 1986, now abandoned.

The invention relates to a process for the preparation of azo compounds by the oxidative coupling of aromatic or heteroaromatic hydrazines or hydrazinium compounds with aromatic amines, phenols or CH-acidic compounds.

Oxidative coupling is widely known ((cf. Houben-Weyl, Methoden der organischen Chemie (Methods of organic chemistry) X/3, page 360 et seq.)).

The method of preparing azo compounds has been described particularly frequently in connection with quaternary hydrazinium compounds (cf. Angw. Chem. 70, 215 (9158), 74, 818 (1962) and 80, 343 (1963).

In contrast little has been reported hitherto on oxidative coupling with non-quaternised, that is to say neutral hydrazines (cf. Chemistry Letters 1733–1736 (1981); DL 100 965 and J. prakt, Chem. 312 (1970), 533–541, and Liebigs Ann. Chem. 754, 46 (1971).

The disadvantage of the processes so far known lies above all in the fact that they are in most cases only practicable in the case of very specific systems and even then frequently only provide unsatisfactory yields.

There has also been the belief that neutral hydrazine compounds decompose before oxidative coupling takes place (F. Korte, Methodicum Chinicum, Vol. 6, 87 et seq. (1974) G. Thieme, Academic Press, Stuttgart).

It is for this reason that oxidative coupling is described as a process of no industrial importance (K. Hunger; Azobenzol and Derivate(Azobenzene and its derivatives) Vol. 8, Chapt. 2.4 in Ullman: Enzyklopädie der technischen Chemie (Encyclopedia of industrial chemistry), 1974)).

Thus the present invention is based on the aim of developing a universally applicable process for oxidative coupling which can also be carried out on an industrial scale.

It has now surprisingly been found that the principle of oxidative coupling for the preparation of azo dyestuffs can be used with considerably more universal success if the oxidation is carried out in the presence of redox mediators* with a standard potential of 0.2–1.5 volts and, if appropriate, an additional oxidising agent with a standard potential of 0.25–2.5 volts wherein the sum of the oxidation equivalents should be at least 4.
*H. Wendt: "Organische Elektrochemie", Chemie in unserer Zeit, ("Organic Electrochemistry", Chemistry today, 19 (5), 1985, 145–154)

The "Redox mediators" should contain elements which form stable and isolable compounds in at least 3 different oxidation numbers and can act in at least 4 redox pairs with in each case different standard potentials.

Suitable "Redox mediators" are elementary iodine and compounds from which iodine can be liberated by heat, reduction or oxidation.

NaI, KI, NaIO$_3$ and KIO$_3$ are preferred; elementary iodine is very particularly advantageous.

In general 0.1–50 mol % of (elementary) iodine is used per mol of the hydrazine compounds. Preferably 2–10 mol % are used.

The term redox mediator should generally refer to inorganic and organic substances. As is known organic mediators are obtained from natural products or prepared chemically by synthesis.

The term mediator, which is especially used in electrochemistry should not, however, exclude purely catalytically acting substances (cf. J. Simonet: "Electrogenerated Reagents" in M. M. Baizer, Organic Electrochemistry, 1983, New York).

Otherwise the reaction is carried out under conditions which are customary for oxidative coupling reactions, i.e. at about −10° to 130° C., preferably 10°–80° C. in a solvent which is inert under the reaction conditions and preferably in the presence of an oxidising agent.

Possible oxidising agents are: hydrogen peroxide, alkali metal bromates, alkali metal persulphates, alkali metal hydrochlorides, oxidising heavy metal salts (Hg-II, Cu-II, Pb-IV, Cer-IV), alkali metal perborates, alkali metal percarbonates, alkali metal chlorites, air, $K_3Fe(CN)_6$ etc. (alkali metal=Na/K).

Preferred oxidising agents have a standard potential of 0.4–1.3 volts, for example 0.54; 0.59; 0.60; 0.99; 1.09; 1.19 and 1.21. (In English literature these potentials are frequently provided with a negative symbol). These potentials can also be adjusted electro-chemically under the conditions of indirect electrolysis.

Of course the "redox mediators" actually used as catalysts, for example iodine or KIO$_3$, can also be used as oxidising agents - but in this case in "oxidation-equivalent" quantities.

The total of 4 oxidation equivalents which have to be provided refer to the theoretical minimum. In practice a certain (i.e. about 5 to 10%) excess of oxidation equivalents will be employed as a precaution.

Preferred solvents or diluents which may be used are:

Water and protic organic solvents such as alcohols and fatty acids.

Examples which may be mentioned are: Ethanol, isopropanol, n-butanol, 2-ethylhexanol, diethylene glycol, butanediols, acetic acid, propionic acid, ethylhexanoic acid, etc.—and water added in quantities of 0.1–10 parts by weight.

In special cases solvents which are aprotically water-miscible (DMF, sulpholane, dioxan, acetonitrile etc.) are also suitable.

In same cases 2-phase systems, if appropriate in the presence of emulsifiers, dispersants, phase transfer catalysts and other auxiliaries, are advantageous.

The process can be carried out discontinuously or continuously (for example using metering devices), it being possible to introduce the reactants separately or already premixed to a certain extent and with or without a solvent. When carrying out the process in practice it is advantageous to initially introduce the iodine catalyst in a suitable solvent and then add the remaining reactants.

Suitable aromatic or heteroaromatic hydrazine compounds are highly electronegatively substituted aromatic hydrazines (e.g. 2,4-dinitro-6-bromohydrazine, 2-nitro-4-cyanohydrazine, 2,4-dinitrophenylhydrazine, 2-chloro-4-nitrophenylhydrazine, 2-chloro-4,6-dinitrophenylhydrazine) and hydrazines of 2-thiophene, thiazole and particularly of 2-benzothiazolyl, 2-benzoxazole and 2-benzimidazole, corresponding to the formula

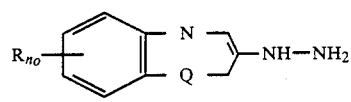

wherein
Q denotes S, O or —NR',
R denotes H, alkyl or aryl,
$n_o$ denotes 1-4 and
R denotes H, F, Cl, Br, CN, NO$_2$, alkyl, aryl, COO—, alkyl—S—, alkyl—SO$_2$—, NH—acyl (e.g. NHCOCH$_3$), O-alkyl or SCN, and the substituents can be single or multiple or combined with each other as desired.

The preferred hydrazine derivatives are mainly substituted in the 6- and/or the 4-position of the benzene part.

The hydrazines are mainly used in the free form, i.e. without any protective groups.

Compounds with protective groups (e.g. —SO$_2$—aryl, —HC=O or —CO—aryl/-alkyl) can by all means be used directly, although the reaction time and the yield may vary.

Further suitable hydrazine compounds are (optionally substituted) 2-hydrazinothiazoles, e.g. 2-hydrazino-4-phenylthiazole, 2-phenylsulphonylhydrazido-5-nitrothiazole, (optionally substituted) 3-hydrazino-2,1-benziso-thiazoles, for example 3-hydrazino-5-nitro-2,1-benziso-thiazole.

(optionally substituted) 2-hydrazinothiadiazoles, e.g. 5-hydrazino-3-phenyl-1,2,4-thiadiazole, 2-hydrazino-5-ethylmercapto-1,3,4-thiadiazole.

(optionally substituted) 2-hydrazinobenzoxazoles, e.g. 2-hydrazino-5-nitrobenzoxazole, 2-hydrazino-6-nitro-benzoxazole, also 2-hydrazino-3,5-dinitrothiophene, (optionally substituted) 2- and 4-hydrazinopyridines, e.g. 4-hydrazino-3,5-dibromopyridine, 4-hydrazinopyridine, 2-hydrazino-5-nitropyridine, 2-hydrazino-3,5-dinitropyridine, 2-chloro-3-cyano-6-hydrazino-4-methylpyridine and 3-cyano2,5-dichloro-6-hydrazino-4-methylpyrid (optionally substituted) quinolinyl and isoquinolinyl hydrazines; (optionally substituted) 3-and 4-hydrazino-py-ridazines, for example 3-chloro-6-hydrazinopyridazine or 3,6-dichloro-5-hydrazinopyridazine;

(optionally substituted) hydrazinoquinoxalines, for example 2-chloro-3-hydrazinoquinoxaline, (optionally substituted) hydrazinophthalazines, -cinnolines, -quinazolines or -imimdazoles, (optionally substituted) 2- and 4-pyrimidylhydrazines, e.g. 2,5-dichloro-6-hydrazino-4-methylpyrimidine, 4,5-dichloro-6-hydrazino-2-methylpyrimidine, 2,4,5-trichloro-6-hydrazinopyrimidine, 2,5-dichloro-4-methyl-6-hydrazinopyrimidine or 2-fluoro-5-chloro-6-hydrazino-4-methylpyrimidine;

(optionally substituted) hydrazinotriazines, for example, 2-hydrazino-4,6-dimethoxytriazine, 2-cyclohexylamino-4-hydrazino-6-methoxytriazine, 2-dibutylamino-4-hydrazino-6-methoxytriazine or 2-chloro-4-dibutylamino-6-hydrazinotriazine.

Preferred coupling components are particularly those of the aniline series, which correspond to the following general formula:

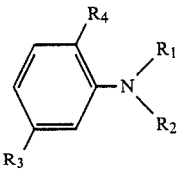

wherein
R$_1$ and R$_2$ denote H, alkyl or aralkyl optionally substituted by F, Cl, Br, OH, SO$_3$H, COOH, COO-alkyl or CONH$_2$
R$_3$ denotes H, optionally substituted alkyl or aralkyl, NH-acyl, —O—alkyl, —O—aryl, —(OCH$_2$CH$_2$)$_m$—OH, —OCO-alkyl, —OCO—O-alkyl, —NR'R" (R', R"=H or alkyl; m=1–100) or NH—SO$_2$—alkyl, and
R$_4$ denotes H, alkyl, F, Cl, Br, O-alkyl or O-aryl.

These coupling components are particularly those which are customary in the chemistry of disperse dyes and are described in detail in the relevant literature.

Other coupling components such as phenols, naphthols and derivatives thereof which are advantageously substituted by alkyl-halogen-amino-carboxylic acid groups or sulphonic acid groups can also be used.

Examples which may also be mentioned are CH-acidic compounds such as substituted acetoacetic esters, malonic esters or substituted cyanoacetic esters, pyrazolones, preferably 1-phenyl-3-methylpyrazol-5-one or pyridones, aromatic amines, preferably N,N-dialkylated m-anisidines or m-toluidines, and aliphatic and/or aromatic hydrazones, which can advantageously be substituted by hydroxyl, carboxyl, sulphonyl or other groups.

Otherwise the alkyl radicals mentioned above in various contexts are preferably those with 1-6 C-atoms and the aryl radicals mentioned are preferably phenyl radicals, and both can be substituted by customary substituents, such as, for example, Cl, Br, F, alkyl, —CO—alkyl, OCO-alkyl, O—CO—O—alkyl, -(oxyalkylene)$_n$—OH, —N$^+$(alkyl$_n$X$^-$, —SO$_3$H, —COOH or CN, wherein "alkyl" denotes C$_1$–C$_4$-alkyl.

The hydrazino compounds required as starting substances can be prepared by reacting the corresponding halogen (in particular chlorine), alkoxy, for example methoxy, alkylsulphonyl, for example ethylsulphonyl, arylsulphonyl, sulphonic acid or amino derivatives with hydrazine hydrate, substituted hydrazines, hydrazides or hydrazones, by processes known in the literature (cf. S. S. Joshi and O. S. Deorha, J. Ind. Chem. 28 (1951), 34; M. Tomita et al. J. Pharm. Soc. Japan 71 (1951), 850–854; Sehouten Recueille 56 (1937), 541; T. L. Morrill et al. Org. Prep. and Proc. Int. 7 (2), 67–70 (1975).

Substituted heterocyclic halogen compounds, for example chlorinated triazines, pyrimidines, pyrazines, pyridines or quinoxalines, which have so far been used for example as reactive groups in azo dyestuffs are particularly preferably subjected to "hydrazinolysis".

Apart from the abovementioned advantages of the process according to the invention the following advantages must be particularly emphasised.

1. It also allows the preparation of those types of dyestuffs which are only very difficult to obtain by the diazotisation and coupling reaction which is otherwise customary.

2. It is easier to carry out since particularly in the preferred temperature range no cooling or heating is required and the reactants can be added in a very advantageous sequence.

3. It is environmentally more favourable since the solvents used can be recovered easily and in contrast to the oxidative coupling reactions so far employed it is possible to use smaller amounts of or no heavy metal salts.

4. It is more economic since, in contrast to the diazotisation and coupling reaction only small amounts of acid have to be used and neutralisation can be omitted from the working up process.

The process according to the invention is suitable not only for the preparation of valuable azo dyestuffs but also for practical purposes, for example for dyeing materials, for analytical uses and for photographic or electro-photographic purposes.

The materials to be dyes may be selected from synthetic or natural inorganic polymers. These can be textile, porous, fibrous and/or woven or knitted materials as well as smooth sheet-like materials.

Suitable polymeric materials are, for example, aromatic or aliphatic polyamides, polyimides, polyesters, polyhydantoins, polyamide imides, polycarbonates and polyphenylene sulfides as well as polyacrylonitrile, polystyrene, halogenated polymers such as polyvinyl chloride, polyvinylidene chloride, polyethers, cellulose, polyurethanes, cellulose acetate, viscose, silk, cotton, wool, leather, paper, linen or blends thereof or graft and co-polymers thereof.

The dyestuffs produced according to the invention can, of course, be added to the abovementioned polymeric materials during the spinning or injection-moulding processes.

According to observations so far made the dyestuff produced according to the invention are also suitable for dyeing inorganic materials based on aluminium, steel, aluminum oxide, silica gel, carbon or carbon/silica fibres, porcelain and enamel.

A particular process variant is carried out in such a manner that the dyestuff is produced directly on the fibre.

This process variant consists in impregnating the material to be dyes by wetting it with or immersing it in a mixture consisting for example of an aromatic or heteroaromatic hydrazine compound and a CH-acidic coupling component from the aniline and/or phenol series, optionally drying it and then dyeing the substrate surface by immersion, wetting or spraying using a liquor consisting of a mediator and/or by subsequent after-treatment with an oxidising agent.

The sequence or liquor composition can be varied as desired when carrying out this dyeing variant: It is for example possible to select the sequence: coupling component, hydrazine compound, mediator and oxidising agent.

A further example which may be mentioned is the pretreatment of the substrate surface in a liquor consisting of an oxidizing agent, a heteroaromatic or aromatic hydrazine compound and a coupling component followed by treatment in a mediator-containing medium. These dyeing processes are distinguished by the fact that they are not only environmentally particularly favourable but also allow quantitative and/or qualitative detection of mediators, oxidising agents, aromatic or heteroaromatic hydrazine compounds and/or coupling components.

EXAMPLE 1

1.5 g of iodine are added to a mixture of 160 g of n-butanol, 21 g of glacial acetic acid and 60 ml of water. Using about 4 g of 85 % strength phosphoric acid a pH value of 1.3–1.5 is adjusted which must be maintained during the course of the reaction possibly by further additions of acid; (it also possible to partially substitute this acid with sulphuric acid).

In the course of 4–5 hours 33.7 g of N-cyanoethyl-N-acetoxyethylaniline in the form of an approximately 60 % acetic acid solution are added dropwise and 31.6 g of 2-hydrazine-6-nitrobenzothiazole are added in the form of an aqueous paste to this iodine solution; the addition is divided into 10 portions (1 portion every 20–30 minutes), 31,5 g of a 33% aqueous hydrogen preoxide solution is also added dropwise in the course of 4–5 hours, the temperature being maintained at 20°–25° C. by means of water cooling and thorough mixing being ensured. The mixture is stirred for a further 2 hours and the suspension obtained is filtered off by suction. The pressed cake is washed with 2 l of warm water, pressed well and dried in vacuo at 60°–80° C. 65–70 g of the dyestuff of the formula

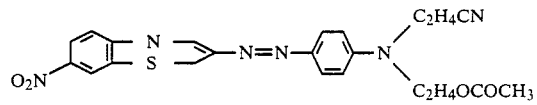

are obtained in an approximately 95° C. yield. The filtrate first obtained, which has a volume of about 300 ml is distilled in a rotary evaporator: bath temperature 20°–80° C.; ultimate vacuum: about 30 mbars; about 70–80 % of the solvent used is recovered.

If the same method is followed but without the use of iodine only about 3 % of theory of the dyestuff are obtained.

EXAMPLE 2

2.1 g of 2,4-dinitrophenylhydrazine and a solution of 2.2 g of KIO$_3$ in 100 ml of water are added in the course of 2–3 hours to a mixture of 3.5 g of N,N-diacetoxyethyl-2-methoxy-5-acetylaminoaniline, 200 ml of water, 5 ml of glacial acetic acid and 20 ml of 1,4-butanediol at pH 4, with stirring. The mixture is stirred for a further 3 hours and the reaction product is filtered off. After drying 5.3 g of the dyestuff of the formula

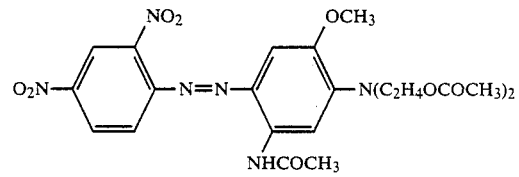

are obtained.

EXAMPLE 3

A suspension of 7 g of 2,4-dinitro-6-chlorophenylhydrazine and 10.6 g of N,N-diacetoxyethyl-2-methoxy-5-acetylaminoaniline in 45 ml of glacial acetic acid is added to a solution of 0,5 g of KI, 75 ml of water, 75 ml of n-butanol and 30 ml of glacial acid which has been adjusted to pH 3.5 with conc. NaOH, with vigorous stirring in the course of 4–5 hours. At the same time 5.1 g of KBrO₃ in 60 ml of H₂O are added dropwise. The mixture is stirred for a further 2 hours and the reaction product is filtered off. After drying 13.9 g of the dyestuff of the formula

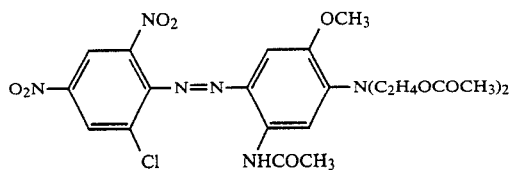

are obtained. If the same method is followed but without using potassium iodide, at most 1 % of the required blue dyestuff is obtained.

EXAMPLE 4

24.6 g of 2-chloro-4,6-dinitrophenylhydrazine and 20.5 g of N,N-diethyl-3-acetaminoaniline are introduced, in portions, in the course of 4 hours, to a solution of 2.5 g of iodine in 50 ml of glacial acetic acid/700 ml of water/350 ml of n-butanol, which had been adjusted to pH 4 using a half-concentrated sodium hydroxide solution. At the same time 23 ml of a 33 % hydrogen peroxide solution are added proportionately.

The mixture is stirred for a further 3 hours and the dyestuff obtained, of the formula

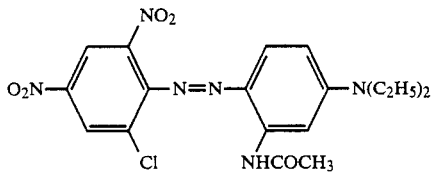

is filtered off. Yield: 42.5 g.

EXAMPLE 5

Equimolar quantities of 2,4-dinitrophenyl-hydrazine and N,N-diethyl-2-methoxyethoxy-5-acetylamino-aniline are reacted with each other following the same procedure as in Example 4 (but without using glacial acetic acid as the solvent). A pH value of 6 is adjusted using a phosphate buffer. 45 g of the dyestuff of the formula

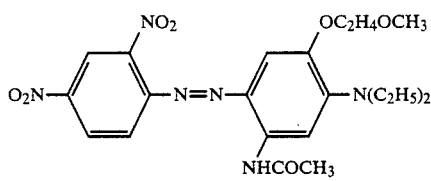

are obtained.

EXAMPLE 6

Following the same procedure as in Example 4 and using the appropriate starting materials the dyestuff of the formula

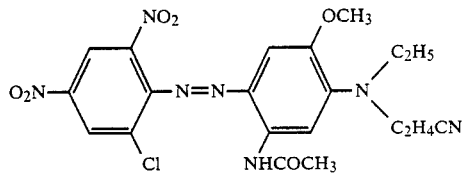

is prepared, at pH 6, in an approximately 90 % yield.

EXAMPLE 7

Following the same procedure as in Example 4 and using the appropriate starting materials the dyestuff of the formula

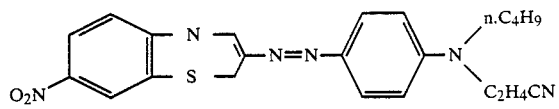

is prepared, at pH 3, in an approximately 90 % yield.

EXAMPLE 8

While stirring well a pulverulent mixture of 15,8 g of 2-hydrazino-6-nitrobenzothiazole, 17,2 g of N,N-diethyl-2-methoxy-5-acetylaminoaniline and 22,3 g of sodium perborate is added continuously, over a period of 4–5 hours at 20° C. by means of a metering device, to a solution of 200 ml of n-butanol, 50 ml of acetic acid, 4 g of iodine and 300 ml of water.

At the beginning of the reaction the pH value is adjusted to 5.0 using 40 % sodium hydroxide solution. The mixture is then stirred for a further 5–6 hours. The product is filtered off, the filtrate is separated off (the main quantity of the solvent can be recovered by distillation, as described in Example 1) and subsequently washed with approximately 2 l of water having a temperature of 50° C. After drying 28.8 g of a dyestuff of the formula

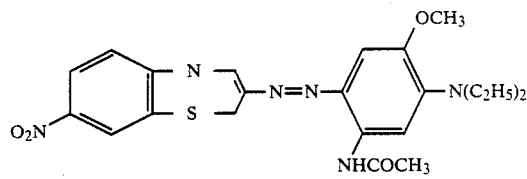

are obtained.

EXAMPLE 9

The oxidative coupling is carried out at a potential of (+) 0.6–0.9 volts in an apparatus which is suitable for indirect electrolysis and consists of a potentiostat and platinum or carbon electrodes as the working electrodes, a calomel or AG/AgCl electrode (reference electrode) and a platinum or tungsten electrode as the counterelectrode;

0,2 g of dinitrophenyl hydrazine and 0,2 g of m-acetylamino-N,N-diethylaniline dissolved in 20 ml of DMF, are added dropwise, within 2–3 hours, to a solution of 3 g of glacial acetic acid, 2 g of sodium acetate and 0,05 g of iodine in 60 ml of dimethyl formamide and 10 ml of water.

Then the mixture is diluted with about 100–200 ml of water in order to precipitate the dyestuff completely.

Filtering off and drying produces about 0.4 g of the dyestuff of the formula

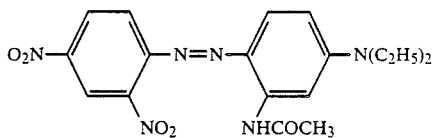

which corresponds to a yield of about 50 % of theory.

In the following further examples of dyestuffs which can be prepared by the process according to the invention are listed in the form of a table;

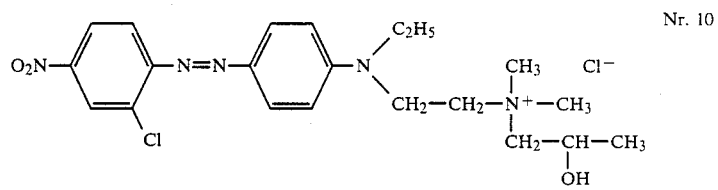

Nr. 10

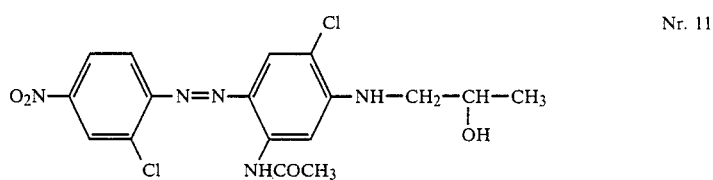

Nr. 11

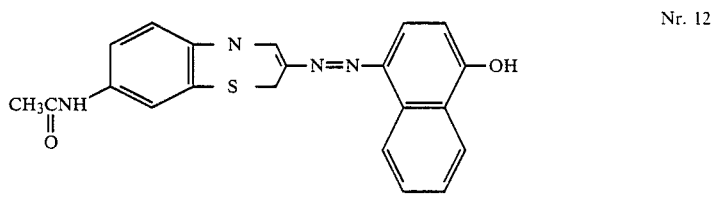

Nr. 12

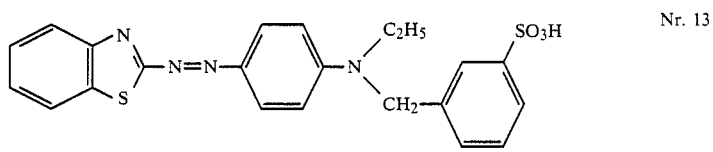

Nr. 13

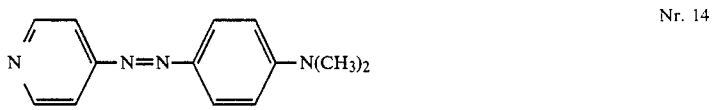

Nr. 14

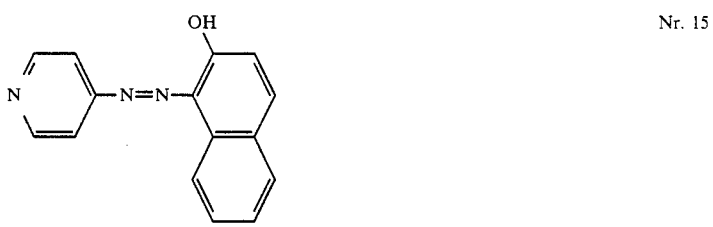

Nr. 15

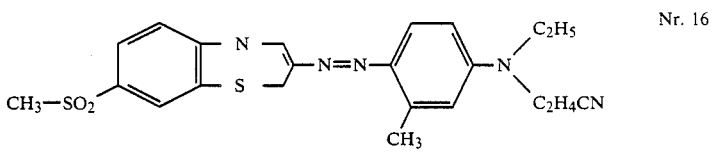

Nr. 16

-continued
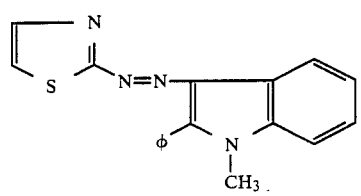 Nr. 17
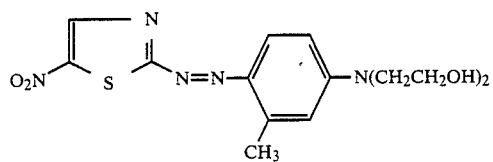 Nr. 18
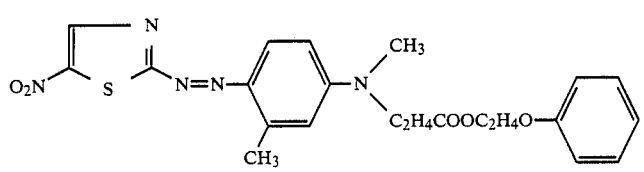 Nr. 19
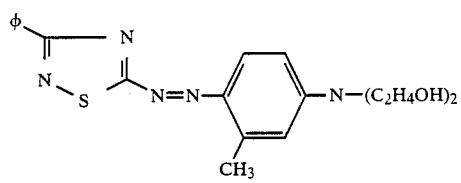 Nr. 20
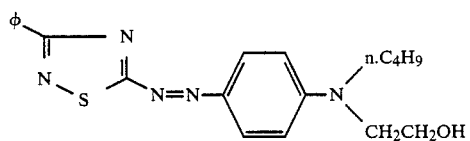 Nr. 21
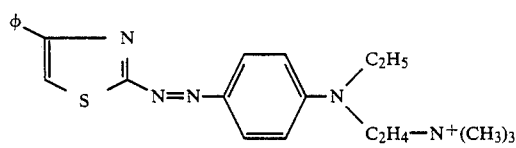 Nr. 22
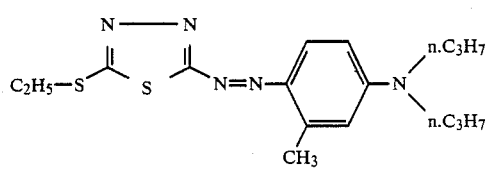 Nr. 23
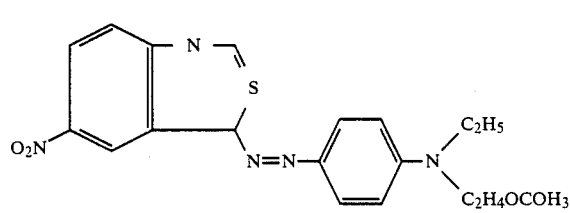 Nr. 24
φ = Phenyl

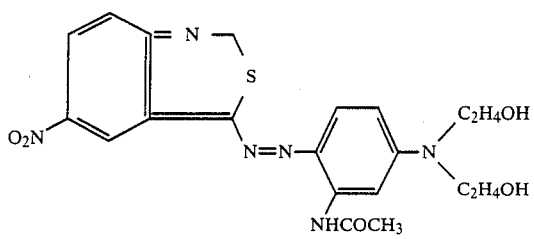
Nr. 25

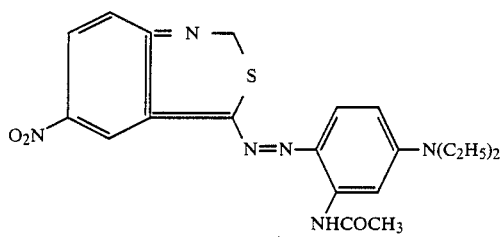
Nr. 26

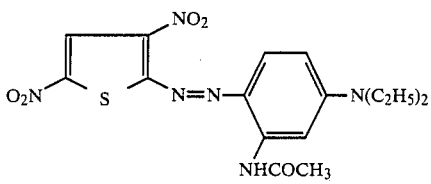
Nr. 27

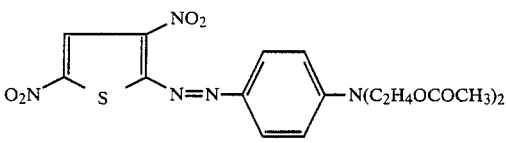
Nr. 28

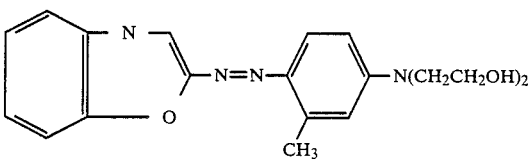
Nr. 29

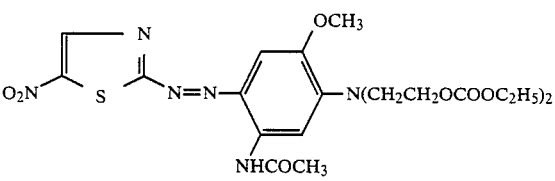
Nr. 30

Dyeing Example 20 g of porous perlon (polyamide-6 fabric) are fixed, at a liquor ratio of 1:10, with 1 g of N,N-diacetoxyethyl-3-acetylamino-6-ethoxy-aniline for 1 hour at between 80 and 100° C. (degree of absorption about 20 %).

After rinsing with an ample amount of cold water a fresh bath is prepared consisting of 0.5 g of glacial acetic acid, 0,5 g of sodium acetate, 200 ml of water, 0,2 g of dinitrophenylhydrazine and 0,1 g of potassium iodide, and then it is reheated with continuous liquor circulation (apparatus: Praxitest manufactured by the Original Company, Hanau).

0.4 ml of 30 % hydrogen peroxide are added in the course of 1 hour at between 80° and 100° C. The temperature is kept at 100° C. for a further 1 hour. After rinsing and drying a blue dyeing on polyamide is obtained. If KI is not added only a pale yellowish dyeing is obtained.

Example of the Analytical Method

Various CH-acidic compounds, dissolved in dimethyl formamide, are applied to glass slides which are coated with porous silica gel (Merck Company).

Development is carried out in a mixture of for example toluene, dioxan and glacial acetic acid and the slide is then sprayed with a warm butanolic solution of an aromatic hydrazine (dinitrophenylhydrazine).

Then the slide is sprayed with an aqueous potassium iodide solution which contains a suitable buffer, and then with an aqueous hydrogen peroxide solution. After some time deeper dyeings are produced in those areas where coupling components are present. The formation of the dyestuff can also be carried out by normal bath development, for example using an aqueous solution of

I claim:

1. Process for the preparation of azo compounds by the oxidative coupling of aromatic or heteroaromatic hydrazines with aromatic amines of the formula

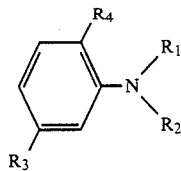

wherein
- $R_1$ and $R_2$ denote H, unsubstituted alkyl or aralkyl or alkyl or aralkyl substituted by F, Cl, Br, OH, $SO_3H$, COOH, COO-alkyl or $CONH_2$ and
- $R_3$ denotes unsubstituted alkyl or aralkyl, or alkyl or aralkyl substituted by Cl, Br, F, alkyl, —CO—alkyl, OCO-alkyl, O—CO—O-alkyl, -(oxyalkylene)$_n$OH, —N$^+$(alkyl)$_n$X$^-$, —$SO_3H$, —COOH or CN; NH-acyl, —O—alkyl, —O—aryl, —(OCH$_2$CH$_2$)$_m$—OH, —OCO-alkyl, —OCO—O-alkyl, —NR'R'' (R', R''=H or alkyl; m=1–100) or NH—$SO_2$-alkyl, and
- $R_4$ denotes alkyl, F, Cl, Br, O-alkyl, or O-aryl, wherein the oxidation is carried out in the presence of redox mediators with a standard potential of 0.99–1.5 volts said redox mediators being elementary iodine or iodine-liberating compounds.

2. A process according to claim 1, wherein the iodine-liberating redox mediator is NaI, KI, NaIO$_3$ or KIO$_3$.

3. A process according to claim 1, wherein the redox mediator is elemental iodine.

4. A process according to claim 1, wherein 0.1 mol percent of redox mediators are used per mol of hydrazine.

5. A process according to claim 1, wherein the hydrazine compounds used are benzothiazoles.

6. A process according to claim 1, wherein the potentials are adjusted electrochemically.

7. A process according to claim 1, wherein the oxidative coupling is carried out in the presence of an additional oxidizing agent with a standard potential of 0.25–2.5 volts, wherein the sum of the oxidation equivalents is at least 4.

* * * * *